United States Patent
Liu et al.

(10) Patent No.: US 9,477,621 B2
(45) Date of Patent: Oct. 25, 2016

(54) BANDWIDTH CONTROL METHOD FOR AN ON-CHIP SYSTEM

(71) Applicant: SAGEM DEFENSE SECURITE, Boulogne-Billancourt (FR)

(72) Inventors: Celine Liu, Boulogne-Billancourt (FR); Nicolas Charrier, Boulogne-Billancourt (FR); Nicolas Marti, Boulogne-Billancourt (FR)

(73) Assignee: SAGEM DEFENSE SECURITE, Boulogne-Billancourt (FR)

( * ) Notice: Subject to any disclaimer, the term of this patent is extended or adjusted under 35 U.S.C. 154(b) by 0 days.

(21) Appl. No.: 14/772,760

(22) PCT Filed: Mar. 4, 2014

(86) PCT No.: PCT/EP2014/054121
§ 371 (c)(1),
(2) Date: Sep. 3, 2015

(87) PCT Pub. No.: WO2014/135513
PCT Pub. Date: Sep. 12, 2014

(65) Prior Publication Data
US 2016/0019173 A1    Jan. 21, 2016

(30) Foreign Application Priority Data

Mar. 6, 2013 (FR) ...................... 13 52017

(51) Int. Cl.
*G06F 13/36* (2006.01)
*G06F 13/28* (2006.01)
*G06F 13/40* (2006.01)
(Continued)

(52) U.S. Cl.
CPC ............. *G06F 13/28* (2013.01); *G06F 13/364* (2013.01); *G06F 13/4022* (2013.01); *G06F 13/4282* (2013.01); *G06F 2213/0038* (2013.01)

(58) Field of Classification Search
USPC .......................... 710/110, 113–125, 309, 316
See application file for complete search history.

(56) References Cited

U.S. PATENT DOCUMENTS

| | | | | |
|---|---|---|---|---|
| 5,544,332 A | * | 8/1996 | Chen ..................... | G06F 13/362 700/14 |
| 5,937,199 A | * | 8/1999 | Temple .................. | G06F 13/24 710/262 |
| 6,026,455 A | * | 2/2000 | Shah .................... | G06F 13/4031 710/100 |

(Continued)

FOREIGN PATENT DOCUMENTS

JP    2002269032 A  *  9/2002

*Primary Examiner* — Paul R Myers
(74) *Attorney, Agent, or Firm* — Blakely Sokoloff Taylor & Zafman LLP (57) ABSTRACT

The invention concerns a bandwidth control method in an on-chip system comprising at least one main master module, at least one secondary master module, at least one slave module and a bus connected to each module on a communication link, the bus comprising interconnection means to make at least one common slave module communicate with at least one main master module and with at least one secondary master module via at least one common path portion, the method comprising the following steps carried out for each common slave module: first detection of a first request to access the common slave module, issued by a main master module, definition of a blocking time Dj associated with the common slave module, blocking, during blocking time Dj, of any data transfer on the at least one common path portion between a secondary master module and the common slave module.

14 Claims, 4 Drawing Sheets

(51) Int. Cl.
*G06F 13/364* (2006.01)
*G06F 13/42* (2006.01)

(56) References Cited

U.S. PATENT DOCUMENTS

| | | | |
|---|---|---|---|
| 6,026,460 A * | 2/2000 | David | G06F 13/4036 710/309 |
| 6,122,694 A * | 9/2000 | Horiguchi | G06F 13/385 710/110 |
| 6,654,855 B1 * | 11/2003 | Bopardikar | G06F 12/121 711/118 |
| 6,857,035 B1 * | 2/2005 | Pritchard | G06F 13/374 700/3 |
| 6,996,630 B1 * | 2/2006 | Masaki | H04L 12/5695 709/239 |
| 7,120,113 B1 * | 10/2006 | Zhang | H04L 12/5693 370/229 |
| 8,250,280 B1 | 8/2012 | Rohana et al. | |
| 2002/0003574 A1 * | 1/2002 | Kawamura | H04N 1/32561 348/222.1 |
| 2010/0318706 A1 * | 12/2010 | Kobayashi | G06F 13/364 710/114 |
| 2012/0246368 A1 | 9/2012 | Kwon et al. | |
| 2014/0047147 A1 * | 2/2014 | Gyobu | G06F 13/374 710/121 |

\* cited by examiner

BANDWIDTH CONTROL METHOD FOR AN ON-CHIP SYSTEM

FIELD OF THE INVENTION

The invention relates to the field of systems on chip often designated by the term system on chip or its abbreviation SoC.

The invention relates more particularly to systems on chip in which the interconnections between modules are made by internal computer buses.

PRIOR ART

A system on chip (SoC) is a complete system embedded on a chip which can comprise one or more processors, memory, interface peripherals and/or other components necessary for performing a complex function.

SoCs generally have hierarchical architecture: "master" modules execute access reading or writing requests to modules called "slaves". For example, typical masters are processors or controllers of direct access to memory (DMA); typical slaves are storage memories or network peripherals.

The interconnections between masters and slaves are typically the responsibility of internal computer buses compatible with one or more communication protocols.

For example, the AMBA protocol ("Advanced Microcontroller Bus Architecture") is a communication standard widely used today especially on SoC multiprocessors. This protocol declines into several versions and variants, including for example AHB ("Advanced High-performance Bus") and AXI ("Advanced eXtensible Interface") which are more particularly dedicated to high-rate transfer of data by bursts.

Figure 1:
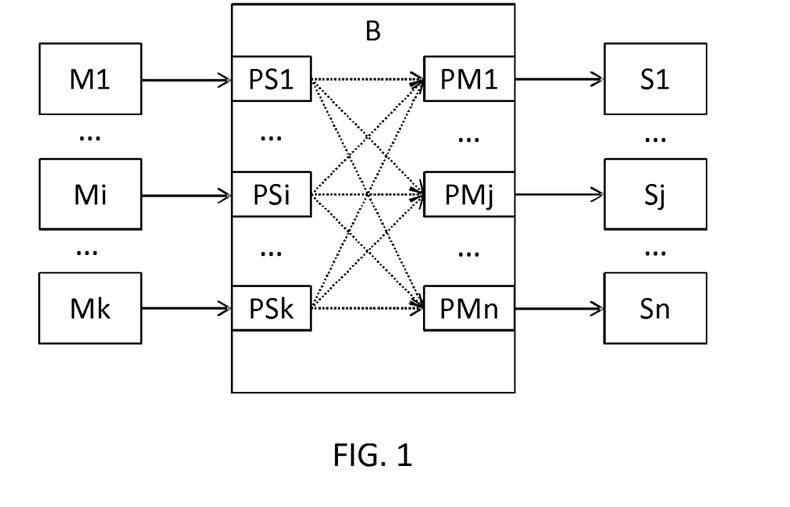
FIG. 1 schematically illustrates a known system on chip.

Referring to FIG. 1, a computer bus B ensuring interconnections between k master modules Mi, i∈[[1,k]] and n slave modules Sj,j∈[[1,n]] The bus B comprises k slave ports PSi, i∈[[1,k]] on each of which is connected a master module, and n master ports PMj,j∈[[1,n]], on each of which is connected to a slave module. So, the bus is seen as a slave by each master module, and seen as a master by each slave module. Data can be sent according to a specific communication protocol over each link between a port of the bus and a module.

The bus B comprises internal routing means, for example one or more stages of switches shown in FIG. 1 by arrows in dotted lines. These means ensure routing of communications between a master and a slave.

The bus B illustrated in FIG. 1 makes all possible interconnections between one of the k masters and one of the n slaves, or k*n interconnections. In this way, the slave S1 can for example receive requests sent by the several masters, and have access alternately shared between the latter. For example, the master M1 can be accessing S1, while the master M2 remains on standby. Once access by M1 is terminated, the master M2 can in turn gain access to S1.

These delays can prove especially annoying in the event where high-priority access must be made very quickly. This the case for example for systems on chip of a level of criticality A according to the RTCA DO-254 standard, on which breakdowns or even transaction slowdowns can have catastrophic consequences, such as for example, systems on chip dedicated to aircraft command control.

Also, some systems on chip make a physical distinction, between high-priority primary masters and low-priority secondary masters. On such systems, access requested by a primary master must be priority relative to the access requested by a secondary master module; consequently, blockage of a transaction underway involving a secondary master module while a primary master is kept on standby can have dramatic consequences.

Now, the majority of computer buses AMBA sold commercially does not offer control of transactions between a master and a slave and does not manage priorities between several masters.

PRESENTATION OF THE INVENTION

The aim of the invention is to resolve the problems of the prior art.

For this to happen, the invention relates especially to a bandwidth control method in a system on chip comprising at least one primary master module, at least one secondary master module, at least one slave module and a bus connected to each module over a communication link, the bus comprising interconnection means for having at least a common slave module communicate with at least one primary master module and with at least one secondary master module by at least one common portion of route, the method comprising the following steps conducted for each common slave module:

initial detection of a first access request to the common slave module sent by a primary master module, determination of a blockage period associated with the common slave module, blockage during the blockage period of any data transfer to the at least one portion of common route between a secondary master module and the common slave module.

The method described especially reserves bandwidth for any primary master module wanting to access a common slave module, both interconnected by means of any computer bus AMBA sold commercially. The adaptation of a computer bus AMBA for the needs of a system on chip at a level of criticality is therefore not necessary.

DESCRIPTION OF FIGURES

Other characteristics, aims and advantages of the invention will emerge from the following description which is purely illustrative and non-limiting, and which must be viewed with respect to the appended drawings, in which.

Similar elements bear identical reference numerals in all figures.

DETAILED DESCRIPTION OF THE INVENTION

FIG. 1 has been described previously.

Figure 2:
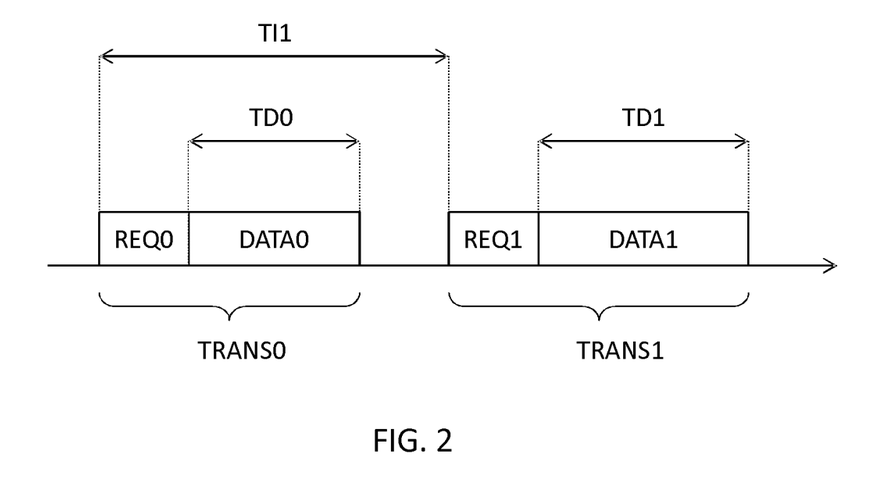
FIG. 2 schematically illustrates two successive transactions.

In reference to FIG. 2, a TRANS0, TRANS1 transaction between a master and a slave comprises at least two phases. In a first request phase, the master module especially requests access to a slave, which the latter accepts or refuses. If access is accepted, a second transfer phase DATA0, DATA1 starts in which data are transferred by bursts from the master to the slave in the case of writing, or from the slave to the master in the case of reading.

In each of the request and transfer phases, information is exchanged between the master and the slave on parallel signals. To carry out a transaction in reading or writing the signals must be positioned according to an ordered sequence comprising request and transfer phases.

Several phenomena can indicate considerable consumption of bandwidth over the communication route between the master and the slave. First, if the duration T0, respectively T1, of a transfer phase of data DATA0, respectively DATA1, is too long.

Also, if the time TI1 elapsed between the start of two successive transactions TRANS0 and TRANS1 to the same slave by a same master is too short.

The AXI protocol defines a unique interface for describing transactions between a master module and a slave module, a master module and the slave port of a bus, or the master port of a bus and a slave module. This interface comprises five channels:

Two channels dedicated to reading (one control channel and one data channel)

Three channels dedicated to writing (one control channel, one data channel and one response channel).

The channels each transport a set of signals sent by a source and unidirectionally. For example, the reading control channel transports request signals from a master to a slave, while the reading data channel returns data carrier signals from a slave to a master.

Two examples of positioning sequence for reading and writing according to the AXI protocol will now be detailed.

Example of Read According to the AXI Protocol

FIG. 2 illustrates for example a positioning sequence of signals for reading according to AXI protocol, completed in four data transfers. The functions of used signals are listed in the table below:

| Signal | Source | Description |
| --- | --- | --- |
| ACLK | Clock source | Reference clock. |
| ARADDR | Master | Read address. |
| ARVALID | Master | Positioned at 1 during transmission by the master of a valid read address, if not at 0. |
| ARREADY | Slave | Indicates if the slave is ready (1) or not (0) to accept a read address and associated control signals. |
| RREADY | Master | Indicates if the master is ready (1) or not (0) to receive read data. |
| RDATA | Slave | Read data. |
| RVALID | Slave | Indicates if the expected read data are ready for transfer (1) or not (0) |
| RLAST | Slave | Indicates the most recent transfer of read data. |

In reference to FIG. 2, a read transaction according to AXI protocol comprises the following steps.

The signal ACLK is synchronised on a clock source. A master sends out the signal ARADDR containing a read address A of the slave to which it wants to give read access. At the same time, the master positions the signal ARVALID at one to signify the validity of the address A to the receiving slave.

The slave confirms the availability of the address A by positioning the signal ARREADY.

The master then positions the signal RREADY at one to signify to the slave that it is ready to read data.

The read data are then sent by the slave to the signal RDATA. FIG. 2 illustrates a burst of four transfers D(A0), D(A1), D(A2) and D(A3). During each transfer, the signal RVALID is positioned at one by the slave to signify the validity of data to the master. To indicate to the master that a transfer is the last one, the signal RLAST is positioned at one at the start of the final transfer D(A3).

The reading illustrated in FIG. 2 is done in thirteen clock strokes (between the clock strokes T0 and T13), including eight for the single data transfer phase.

Example of Write According to the AXI Protocol

Figure 3:
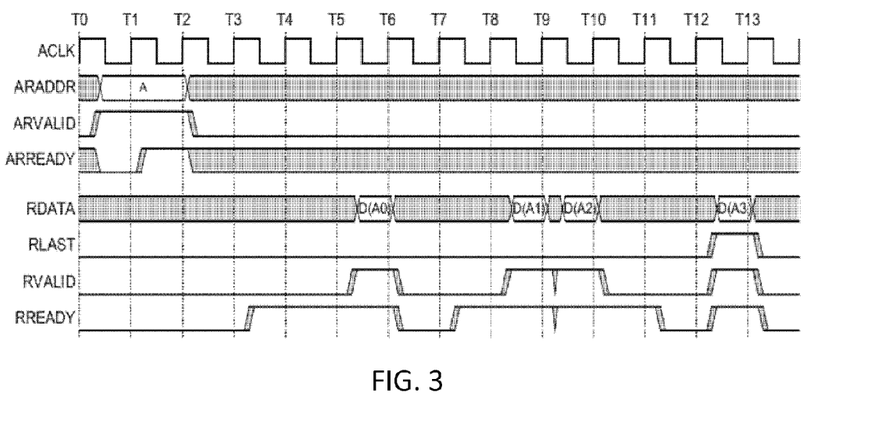
FIG. 3 illustrates a sequence of signals of the AXI protocol sent during reading.
Figure 4:
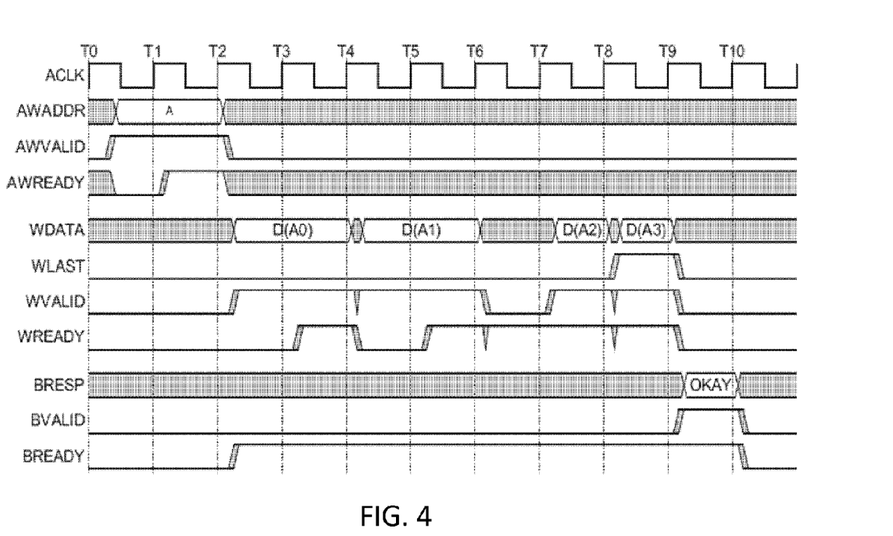
FIG. 4 illustrates a sequence of signals of the AXI protocol sent during writing.
Figure 5A:
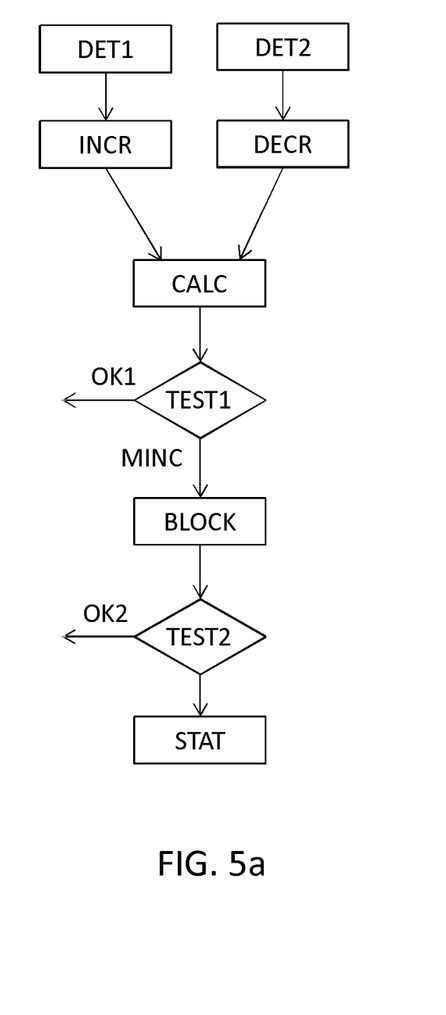
FIGS. 5a to 5d illustrate diagrams of steps of the bandwidth control method according to the invention.
Figure 5B:
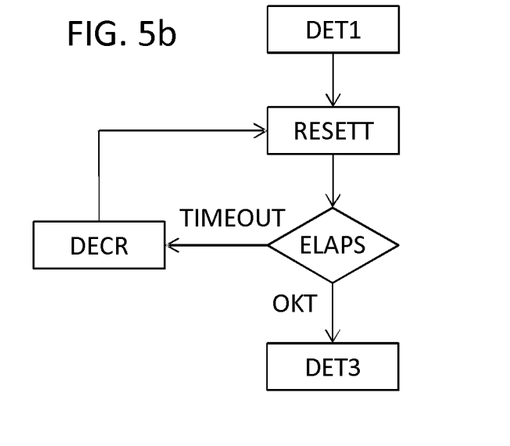
Figure 5C:
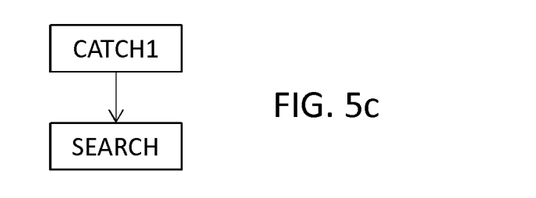
Figure 5D:
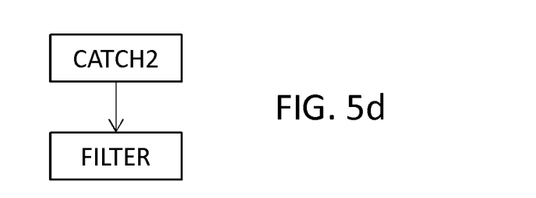

FIG. 3 shows an example of a sequence of positioning signals for writing according to the AXI protocol, and also completed in four data transfers. The functions of these signals are listed in the table below:

| Signal | Source | Description |
| --- | --- | --- |
| ACLK | Clock source | Reference clock. |
| AWADDR | Master | Write address. |
| AWVALID | Master | Positioned at 1 during transmission by the master of a valid write address, if not at 0. |
| AWREADY | Slave | Indicates if the slave is ready (1) or not (0) to accept a write address and associated control signals. |
| WREADY | Slave | Indicates if the slave is ready (1) or not (0) to receive write data. |
| WDATA | Master | Write data. |
| WVALID | Master | Indicates if the write data are ready for transfer (1) or not (0) to the slave. |
| BRESP | Slave | Write result (2 bits): OKAY, EXOKAY, SLVERR, or DECERR. |
| BVALID | Slave | Positioned at 1 during transmission by the slave of a valid write result, if not at 0. |
| WLAST | Master | Indicates the last transfer of write data. |
| BREADY | Master | Positioned at 1 to signify that the master is ready to receive a write result, if not at 0. |

In reference to FIG. 3, a read transaction according to the AXI protocol comprises the following steps.

The signal ACLK is synchronised to a clock source. A master sends the AWADDR signal containing a write address A of the slave to which it wants access. At the same time, the master positions the signal AWVALID at one to signify to the receiving slave the validity of the address A.

The slave confirms the availability of the address A by positioning the AWREADY signal at one.

The master then positions the WREADY signal at one to signify to the slave that it is ready to transmit data to be written.

The write data are then sent by the master to the WDATA signal. FIG. 3 illustrates a burst of four transfers D(A0), D(A1), D(A2) and D(A3). At the start of the first transfer, the BREADY signal is positioned at one by the master to indicate that it is ready to receive a write result which will be sent on completion of the sequence. During each transfer, the WVALID signal is positioned at one by the master to signify to the slave the validity of data to be written. To indicate to the slave that a transfer D(A3) is the last, the signal WLAST is positioned at one at the start of the last transfer.

To confirm writing to the master, the slave then positions the signal BRESP at the value OKAY. This positioning is accompanied by positioning of the signal BVALID at one during sending of the value OKAY. The master finally repositions the BREADY signal to zero once this value is received.

The writing illustrated in FIG. 3 is done in ten clock strokes (between the clock strokes T0 and T10) including seven for the single data transfer phase.

Other signals of the AXI protocol are in practice positioned during reading or writing but they are not detailed in the present document for the sake of simplicity.

The other protocols of the AMBA (AHB, AHB-Lite, APB) family follow the same general principle of write/write transaction and perform the successive phases of request and data transfer with different signals.

Each interface between a bus complying with the AMBA standard and a slave or master module can implement one of the protocols of the AMBA family.

Figure 7:
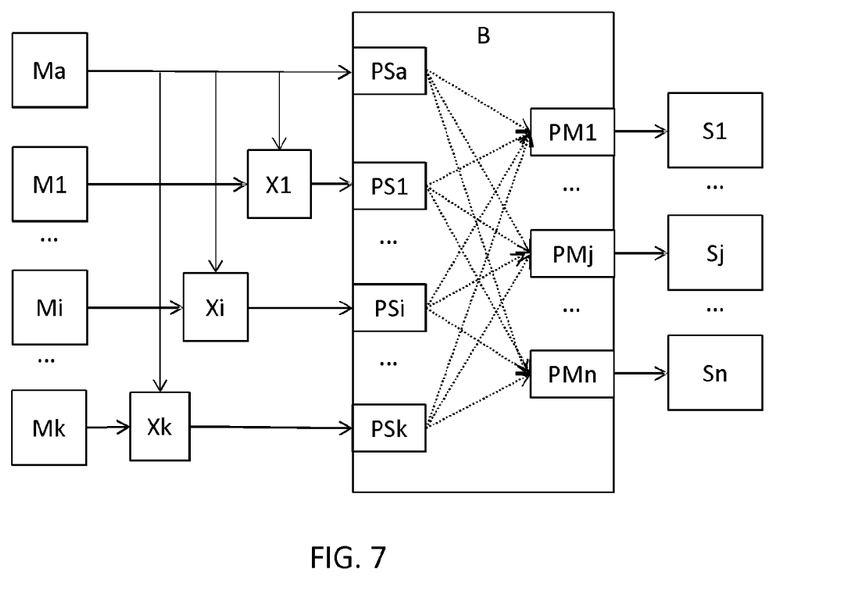
FIG. 7 schematically illustrates a system on chip protected by the bandwidth control device according to the invention.

In reference to FIG. 7, let this be a system on chip comprising at least one primary master module Ma, at least one secondary master module M1, . . . , Mi, . . . , Mk, at least one slave module S1, . . . , Sj, . . . , Sn and a bus B connected to each module by a communication link.

The bus B comprises interconnection means for communicating at least one common slave module Sj with at least one primary master module Ma and at least one secondary master module M1, . . . , Mi, . . . , Mk.

In the present document, a slave module called "common" will designate a slave module on which several concurrent master modules can access by means of the bus B.

The communication route between a secondary master module Mi and a slave module Sj comprises at least two communication links: a first communication link between the secondary master module Mi and a slave port PSi of the bus B, and a second communication link between a master port PMj of the bus B and the slave module Sj. The signals sent by the secondary master module Mi transit via the slave port PSi, then are routed by the bus B to the master port PMj then are sent to the slave module Sj connected to this master port PMj. The signals sent by the slave module Sj to the secondary master Mi follow the same route in reverse direction.

Similarly, the communication route between a primary master module Ma and the slave module Sj comprises two communication links: a first communication link between the master module Ma and a slave port PSa of the bus B, and a second communication link between the master port PMj of the bus B and the common slave module Sj. The signals sent by the master module Ma transit via the slave port PSa, then are routed via the bus B to the master port PMj then are sent to the slave module Sj connected to this master port PMj. The signals sent by the slave module Sj to the secondary master Mi follow the same route in reverse direction.

The two communications routes between the common slave module Sj and the concurrent master modules Ma and Mi therefore have at least a common portion of route. This portion of common route comprises at least the master port PMj and the communication link between this master port PMj and the common slave module Sj.

The bandwidth control method of the invention will now be described in reference to the diagrams of FIGS. 5a to 5d.

In a first detection step "DET1", a first access request to a common slave module Sj sent by a primary master module Ma is detected.

A blockage period $D_j$ associated with the common slave module Sj is then determined in a step referenced "CALC".

Finally, any data transfer over the at least one portion of common route between any secondary master module Mi and the common slave module Sj is blocked "BLOCK", and this happens during the blockage period $D_L$ previously determined.

During the blockage period $D_j$, the portion of common route shared with the primary master module Ma is not occupied by data transferred between a secondary master module Mi and the common slave module Sj. As a consequence, bandwidth is freed up over the communication route between a primary master module (for example the module Ma) and the common slave module Sj.

The method can be repeated for all the common slave modules of the system on chip.

In a variant embodiment, the blockage period $D_j$ associated with a common slave module Sj can be varied according to the number of access requests to this module Sj sent by a set of master modules.

This variation can be ensured by a repetition counter Cj associated with the common slave module Sj. The first detection DET1 is followed by incrementation INCR of said repetitions counter Cj associated with the common slave module Sj, whereof the value increases with the period $D_j$.

In this way, the more primary master modules request access to the common slave module Sj, the more secondary master modules requiring access to this common slave module Sj will be sanctioned, that is, shall wait to access the latter.

The determination step CALC can comprise reading of the value $v_j$ of the repetition counter associated with the common slave module Sj and calculate the blockage period $D_j$ according to a predetermined formula.

The blockage period $D_j$ can for example be proportional to the value $v_j$ of the corresponding repetition counter. The following formula can also be applied:

$$D_j = v_j * T_{max} + T_B, \text{ where}$$

$T_{max}$ is the duration of a data predetermined transfer, for example between the duration of a transfer of maximal size authorised in the system between a master module and a slave module.

$T_B$ is the duration of propagation of a request in the bus B.

The repetition counter Cj can also be decremented "DECR" after a second detection DET2 of a second request sent by a primary master module which can access the common slave module Sj by means of the bus B, to a slave module other than the module Sj.

The primary sending master module of the second request can be the sender of the first request, or more generally any primary master module having a communication route linking it to the common slave module Sj. In this way, a secondary master wanting to access a common slave module will not be sanctioned if no primary master module need to access this same module Sj.

In a variant, not illustrated, the decrementation step DECR can be replaced by resetting the repetition counter Cj fully to zero.

The blockage step (BLOCK) can further comprise the following sub-steps repeated during the blockage period $D_j$:

second interception "CATCH2" of a response signal to the secondary master module Mi positioned at an active value indicating availability of the common slave module Sj, repositioning "FILTER" of said response signal to an inactive value indicating unavailability of said common slave module Sj.

This ensures blockage during the request phase, before the transfer phase starts. In this way, no datum transits over the entire communication route between the secondary slave module Mi and the common slave module Sj, including the portion of route common with the primary master module Ma. Also, on receipt of the response signal, the secondary master module can ask for other access to another module without losing time for transferring data which would be blocked anyway before reaching the common slave module Sj.

Also, the blockage step BLOCK can be conducted unconditionally, or only if a condition is satisfied.

One condition can consist of comparing in a step referenced "TEST1" the value $v_j$ of the repetition counter associated with the module Sj with a first predetermined threshold of occurrences $N_j$.

if $v_j \geq N_j$ ("MING") then the blockage BLOCK is achieved;

if not ("OK1"), the blockage BLOCK is not achieved.

This condition reserves a range of values for the repetition counter Cj in which access to the common slave module is not considered penalising, since it does not take up significant bandwidth to slow down access requested to the common slave module Sj.

A secondary master module wanting to access the common slave module Sj will not be sanctioned. In other terms, this first threshold does not systematically introduce blockages to the system, but only when the value of the counter leaves this range of values.

The method can also comprise an additional sending step "STAT" of a status message to an interruption controller (not illustrated in the figures) after a blockage BLOCK. This step STAT especially notifies a master module, a slave module or else any other third-party module of the system on chip of current consumption of bandwidth.

Also, the sending step STAT can be conducted unconditionally, or only if a condition is satisfied.

One condition can consist of comparing in a step referenced "TEST2" the value $v_j$ of the repetition counter Cj associated with the module Sj with a second predetermined threshold of occurrences $N'_j$.

if $v_j \geq N'_j$ ("MAXC") then sending STAT is achieved;

if not ("OK2"), sending STAT is not achieved.

The second threshold $N'_j$ can be greater than the first threshold $N_j$. Only those messages indicating consumptions bandwidth critical for the system are notified in the step STAT.

The method can also comprise steps of:

third detection "DET3" of a third access request to the common slave module Sj sent by a primary master module, the third detection being later than the first detection DET1, decrementation DECR of the counter Cj associated with the common slave module Sj prior to the third detection DET3, each time the time elapsed from the first detection DET1 exceeds a multiple value of a predetermined time threshold.

This variant takes into consideration the frequency of access of all the primary master modules to the common slave module Sj for calculating a blockage period, and sanctions a secondary master module requiring access to this same common slave Sj.

In fact, if no primary master module accesses the common slave module Sj in a time range greater than the time threshold, the value of the counter Cj will diminish progressively, and will decrease the blockage time imposed on a secondary master module requiring access to Sj.

This variant can be conducted by means of a time counter associated with the common slave module Sj.

After the first detection DET1 of the first request emanating from a primary master module to the common slave module Sj, the time counter is initialised and starts up in a step "RESETT".

In a step ELAPS, the value of the time counter is monitored. Each time ("TIMEOUT") that the value of this time counter exceeds the time threshold the repetition counter Cj is decremented and the time counter is reset and restarted RESETT.

However, if the third detection DET3 occurs before the value of the time counter exceeds the time threshold ("OKT"), the repetition counter Cj is not decremented.

Each counter Cj can be a repetition counter configured with an increment value equal to 1.

As a variant, each counter is a counter whereof the increment value is greater than 1. Each incrementation and decrementation modifies the value of the counter by a value greater than 1.

Figure 6:
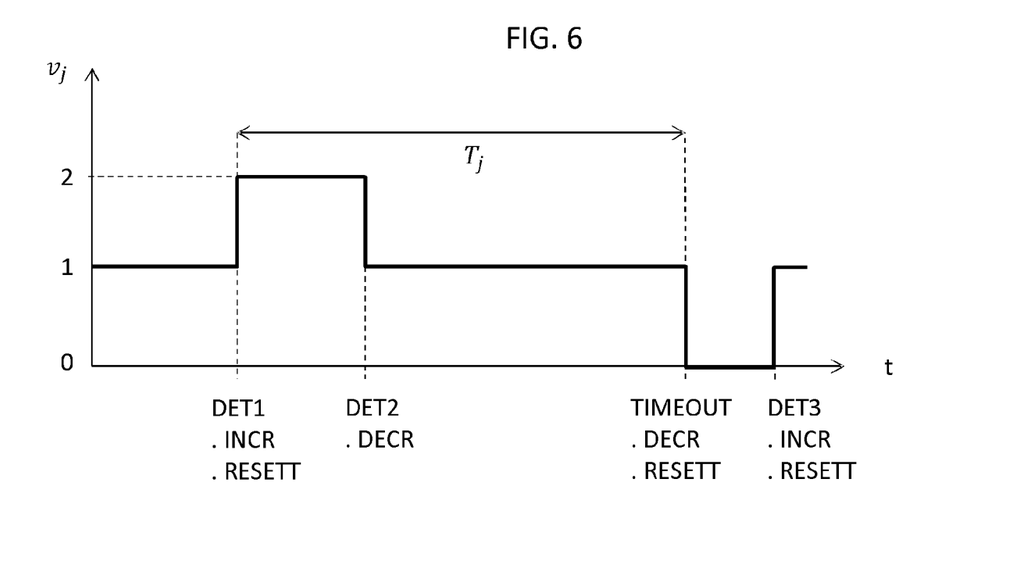
FIG. 6 illustrates the evolution over time of the value of a counter associated with a common slave module as a function of detected requests.

An example of evolution of the counter Cj associated with a common slave module Sj as a function of access requests detected over time will now be detailed as per FIG. 6.

The value of the counter Cj is initially configured to the value 1, and its increment at 1 also.

If a first detection DET1 of a first access request sent by a primary master module to the slave module Sj occurs, then the counter Cj is incremented INCR to the value 2. The time counter associated with the slave module Sj is also reset and started (step RESETT).

If a second detection DET2 of a second access request sent by a primary master module able to access the slave module Sj, to another slave module than the module Sj then occurs, the counter Cj is decremented DECR to the value 1.

When the time threshold $T_j$ is reached (TIMEOUT) by the time counter, a decrementation DECR of the repetition counter Cj is conducted, its value now equal to 0. The time counter associated with the slave module Sj is further reset and restarted (RESETT).

Finally, a third detection DET3 of a third access request sent by a primary master module to the slave module Sj occurs before the time threshold $T_j$ is again achieved by the time counter associated with the module Sj. The counter Cj is incremented to the value 1. The time counter associated with the slave module Sj is further reset and restarted (RESETT).

The reset/restart RESETT step of the time counter associated with the common slave module Sj is performed for each first detection DET1, and/or each third detection DET3.

The step RESETT can also be conducted for each second detection DET2. Also, the detection steps DET1, DET2, DET3 can be conducted over the communication link between the secondary master module Mi and the bus B. This detection placement simply and surely distinguishes that the sender master module of a request is secondary and not primary, and therefore blocks its access to a slave module for the benefit of a third-party primary master module.

In the same way, the blockage step BLOCK can be conducted over this same communication link. This ensures that the secondary sender master module of the access request to the common slave module Sj will be blocked.

The detection steps DET1, DET2, DET3 can also comprise sub-steps of
- first interception "CATCH1" of a signal comprising an access address,
- search "SEARCH" of a receiving slave module corresponding to the access address in a predetermined addressing table.

The detection steps DET1, DET2, DET3 and/or blockage step BLOCK can also be each conducted over a communication link according to a protocol as per the AMBA standard, such as the AXI protocol or the AHB protocol.

The following signals of the AXI protocol can be used:
- signal comprising an access address intercepted in the detection step:
  - for a write access: AWADDR (the signal AWVALID must be positioned at 1 to signify the validity of the address),
  - for read access: ARADDR (the signal ARVALID must be positioned at 1 to signify the validity of the address),
- response signal intercepted in the blockage step BLOCK: AWREADY (for write access) or ARREADY (for read access), The following signals of the AHB protocol can also be used:
- signal comprising an access address intercepted in the detection step: HADDR (the signal HSELx must be positioned at 1 to signify the validity of the address),
- response signal intercepted in the blockage step: HREADY positioned at HIGH (this signal is repositioned at LOW in the repositioning sub-step to indicate unavailability of the common slave module Sj to the secondary master module Mi).

The time counter can also be synchronised with a clock used to synchronise communication signals between the master module and the slave module. The time counter can be incremented for each rising edge detected on the signal ACLK of a communication link as per AXI protocol; so, the time threshold is viewed as a maximal number of clock strokes.

The bandwidth control method can be generalised to any protocol of the AMBA standard or to any combination of protocols of the AMBA family used over a communication route between a master module and a slave module interconnected by at least one bus B.

The bandwidth control method can be executed in a device Xi which will now be detailed.

The bandwidth control device Xi comprises means for detection of signals, storage means, n repetition counters and processing means configured to execute n times in parallel the band control method described earlier. The device Xi can also comprise n time counters.

The storage means of the device Xi are provided for storage of n blockage periods, n first occurrence thresholds, n second occurrence thresholds and/or n time thresholds.

The storage means of the device Xi are also provided for storing n identifiers of slave common modules, and n addressing tables.

All this information can be written in the storage means a single time before commissioning of the system on chip, or be reconfigured dynamically.

The storage means can for example be one or more flash or EEPROM memories.

In reference to FIG. 7, the invention also relates to a system on chip comprising at least one primary master module Ma, at least one secondary master module M1, ..., Mi, ..., Mk, at least one slave module S1, ..., Sj, ..., Sn and a bus B connected to each module over a communication link and at least one bandwidth control device X1, ..., Xi, ..., Xk such as described earlier.

The bus B comprises interconnection means for having at least one common slave module communicate with at least one primary master module and with at least one secondary master module by at least one portion of common route.

Each bandwidth control device X1, ..., Xi, ..., Xk is connected to a secondary master module M1, ..., Mk, to at least one primary master Ma, and to the bus B.

The bandwidth control device X can, by choice, be integrated into a bus, form part of a secondary master module, or else be in the form of an autonomous module placed over the link between a secondary master module and a slave port of a bus B. Each device can be associated with a single secondary master module and block access requests emanating from this secondary master module.

In each bandwidth control device X1, ..., Xi, ..., Xk associated with a respective secondary master module M1, Mi, ..., Mk, a repetition counter Cj, a first occurrence threshold $N_j$, a second occurrence threshold $N'_j$, a time counter and a time threshold can be assigned to a common slave module Sj present in the system on chip.

In this way, any access request to a common slave module emanating from a secondary master module can be controlled, and parameters specific to each pair formed by a secondary master module and a common slave module.

In the embodiment of a system on chip illustrated in FIG. 7, a single primary master module Ma is present, and can access all the slave modules which are all common slave modules shared with the secondary master modules M1, Mi, ..., Mk. As a consequence, each bandwidth control device is connected to the primary master module Ma, and is intended to block requests emanating from a respective secondary master module.

As a variant, a system can comprise several primary master modules, and the slave modules are not all common slave modules.

The bandwidth control devices can be inserted into a conventional system on chip such as that illustrated in FIG. 1 as follows:
- identification of the common slave modules among the slave modules connected to a bus B;
- For each common slave module identified,
  - identification of the secondary master modules which can access the common slave module by means of the bus B,
  - identification of the primary master modules which can access the common module by means of the bus B,
- For each secondary master module identified,
  - insertion of a respective bandwidth control device over the communication link between the secondary master module and the bus B,
  - connection of the bandwidth control device inserted to each identified primary master module.

This produces a system on chip according to the invention.

The invention claimed is:

1. A bandwidth control method in a system on chip comprising at least one primary master module (Ma), at least one secondary master module (M1, ..., Mk), at least one slave module (S1, ..., Sn) and a bus (B) connected to each module over a communication link, the bus (B) comprising interconnection means for having at least a common slave module communicate with at least one primary master module and with at least one secondary master module via at least one portion of common route, the method comprising the following steps conducted for each common slave module (Sj):
- first detection (DET1) of a first access request to the common slave module (Sj) sent by a primary master module (Ma),
- determination (CALC) of a blockage period $D_j$ associated with the common slave module (Sj),
- blockage (BLOCK) during the blockage period $D_j$ of any data transfer over the at least one portion of common route between a secondary master module (Mi) and the common slave module (Sj).

2. The method according to claim 1, wherein the first detection (DET1) causes incrementation (INCR) of a repetition counter (Cj) associated with the common slave module (Sj), the blockage period $D_j$ associated with the common slave module (Sj) increasing as a function of the value $v_j$ of said repetition counter (Cj).

3. The method according to claim 2, wherein the determination step (CALC) comprises reading of the value $v_j$ of the repetition counter associated with the common slave module (Sj) and calculation of the blockage period $D_i$ according to the formula $D_i = v_j * T_{max} + T_g$, where
$T_{max}$ is the duration of a data transfer of maximal size between a master module and a slave module, and
$T_g$ is the duration of propagation of a request in the bus (B).

4. The method according to claim 2 further comprising the steps of:
- second detection (DET2) of a second access request to a slave module not being the common slave module (Sj) sent by a primary master module (Ma) connected to the common slave module (Sj) by means of the bus (B), and
- decrementation (DECR) of the repetition counter (Cj) associated with the common slave module (Sj) caused by the second detection (DET2).

5. The method according to claim 2, wherein the blockage step (BLOCK) is conducted only if the value of the repetition counter (Cj) associated with the common slave module (Sj) is greater (MINC) than a predetermined first threshold of occurrences $N_j$.

6. The method according to claim 2, further comprising a sending step (STAT) of a status message to an error controller only if the value $v_j$ of the repetition counter (Cj) associated with the common slave module (Sj) is greater (MAXC) than a predetermined second threshold of occurrences $N'_j$ greater than or equal to the first threshold of occurrences $N_j$.

7. The method according to claim 2, further comprising steps of:
- third detection (DET3) of a third access request to the common slave module (Sj) sent by a primary master module (Ma), the third detection being later than the first detection (DET1),
- decrementation (DECR) of the counter (Cj) associated with the common slave module (Sj) prior to the third detection (DET3) conducted each time the time elapsed from the first detection (DET1) exceeds a multiple value of a predetermined time threshold $T_i$.

8. The method according to claim 1, wherein the detection (DET1, DET2, DET3) and/or blockage (BLOCK) steps are conducted over the communication link between a secondary master module (Mi) and the bus (B).

9. The method according to claim 1, wherein each detection step (DET1, DET2, DET3) comprises sub-steps of:
- first interception (CATCH1) of a signal comprising an access address,
- search (SEARCH) of a receiving slave module corresponding to the access address in a predetermined addressing table.

10. The method according to claim 9, wherein the signal comprising an access address is HADDR, the step of first interception being conducted over a communication link according to the AHB protocol.

11. The method according to claim 1, wherein the blockage step (BLOCK) comprises the following sub-steps repeated during the blockage period $D_j$:
- second interception (CATCH2) of a response signal to the secondary master module (Mi) positioned at an active value indicating availability of the common slave module (Sj),
- repositioning (FILTER) of said response signal at an inactive value indicating unavailability of said common slave module (Sj).

12. The method according to claim 11, wherein the response signal is HREADY, the blockage step (BLOCK) being conducted over a communication link according to the AHB protocol.

13. A bandwidth control device (W1, . . . , Wi, . . . , Wk) comprising signal detection means, storage means, N repetition counters and processing means configured to execute N times in parallel the bandwidth control method according to claim 1, N being greater than or equal to one.

14. A system on chip comprising at least one primary master module (Ma), at least one secondary master module (M1, . . . , Mk), at least one slave module (S1, . . . , Sn) and a bus (B) connected to each module over a communication link, the bus comprising interconnection means for having at least a common slave module communicate with at least one primary master module and with at least one secondary master module via at least one portion of common route, and at least one bandwidth control device (W1, . . . , Wi, . . . , Wk) according to claim 13 connected to a secondary master module (M1, . . . , Mk), to at least one primary master (Ma), and to the bus (B).

* * * * *